W. E. GREENAWALT.
PROCESS FOR TREATING LIQUIDS WITH GASES.
APPLICATION FILED JAN. 5, 1917. RENEWED NOV. 24, 1919.
1,344,031.
Patented June 22, 1920.
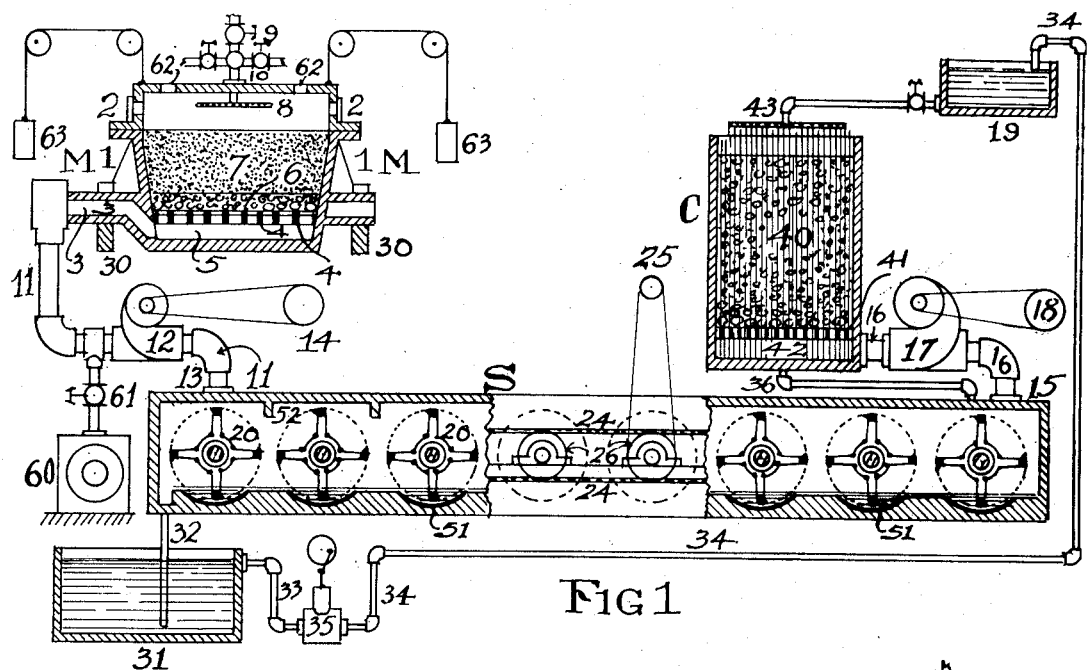
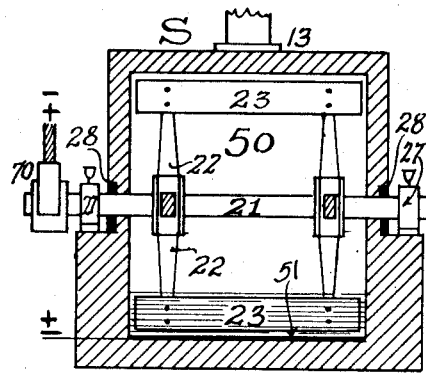
Fig 2
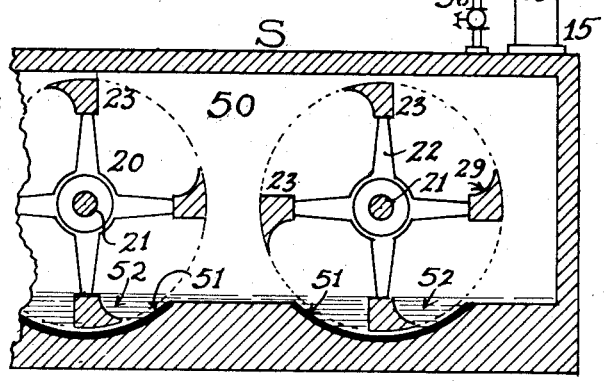
Fig 3
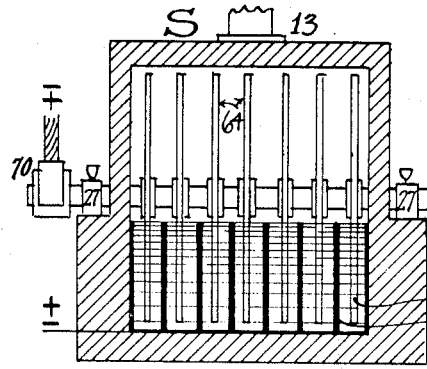
Fig 4
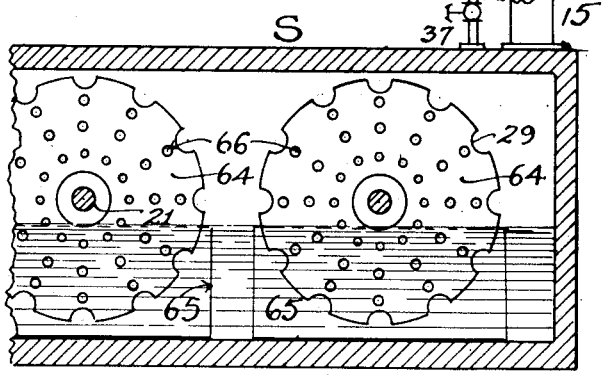
Fig 5
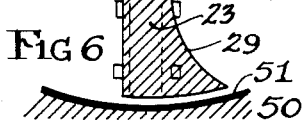
Fig 6
WITNESSES
Effie Jackson
John W. Gibbs
INVENTOR
William E. Greenawalt

UNITED STATES PATENT OFFICE.

WILLIAM E. GREENAWALT, OF DENVER, COLORADO.

PROCESS FOR TREATING LIQUIDS WITH GASES.

1,344,031.  Specification of Letters Patent.  Patented June 22, 1920.

Application filed January 5, 1917, Serial No. 140,738. Renewed November 24, 1919. Serial No. 340,241.

*To all whom it may concern:*

Be it known that I, WILLIAM E. GREENAWALT, a citizen of the United States, residing in the city and county of Denver and State of Colorado, have invented certain new and useful Improvements in Processes for Treating Liquids with Gases, of which the following is a specification.

The invention will be more particularly described in the treatment of liquids with gases resulting from metallurgical operations, such for example, as the recovery of metals from volatile fumes, the precipitation of metals out of solutions, the conversion of sulfur dioxid into sulfuric acid, etc., although it is not intended to limit it to any specific use.

This process corresponds quite closely to that disclosed in my co-pending apparatus, application for treating liquids with gases, Serial No. 16,962, filed March 25, 1915.

It has long been known that under certain conditions of roasting ores, especially chloridizing roasting, some of the values pass off as volatile fumes, and that by intensifying the conditions under which volatilization occurs, such as temperature and air supply, practically all the metals, such as gold, silver, copper, and lead, may be volatilized. Metallurgical processes have been based on this volatility of the metal chlorids to extract the metals from their ores, without leaching, but so far, none of these processes have come into practical use, partly on account of the great amount of gas and dust issuing from the furnace, and partly on account of the lack of suitable methods and apparatus for recovering the values from the fumes.

Hitherto, the usual method of treating furnace gases, either to recover volatile metals, to condense acids, or by electrolysis to convert gases into acids, has been to pass the gases through a scrubbing tower, or condensing tower, in which the gases are passed upwardly while a spray of water is passed downwardly. Such methods of condensation, or of electrolysis, have not proved effective. The contact of water, or liquid, and gas is of short duration, and the contact is not good, since the liquid is not sufficiently sub-divided. In such scrubbing towers channels cannot be avoided, so that the gases escape, improperly treated, through these channels, while the liquid is not sufficiently charged with the gas. Then, too, the dust in the gases has been a great evil, for, as it is forced into the scrubber, the water, at the point of entrance, is insufficient, so that the dust accumulates and clogs the gas passages.

In my present invention all these troubles are overcome, and the gases can be effectually treated. Dust, as it ordinarily occurs in fumes, does not and cannot give any trouble. If the liquid and gases are to be electrolyzed the solutions are maintained charged with the gas while the electrolysis is going on.

The process and apparatus are best described by referring to the accompanying drawings, in which Figure 1 represents the apparatus in connection with other apparatus with which it may be used. Fig. 2 is a detail cross section. Fig. 3 a detail longitudinal section. Fig. 4 and Fig. 5 detail cross section and longitudinal section respectively of a modification of the apparatus. Fig. 6 a detail of the paddles.

In the drawings, M represents a metallurgical furnace, or other source of producing gas to be treated. S, the scrubber, or gas treatment apparatus, and C, a condensing tower, or reaction chamber, through which the gases are passed after having passed through the scrubber.

Referring to the figures, and having in mind more particularly, for the present, the volatilization of metals from their ores or the production of sulfur dioxid, the furnace M consists of a lower part, or holder 1, containing the ore to be treated, and an upper part, or hood, 2, to confine and direct the various gases, such air, sulfur dioxid, hydrocarbons, steam, etc., through the ore, by suction working from below.

The holder 1, is mounted on trunnions, one of which is hollow, 3, and communicates with a chamber 5, in the bottom of the holder, formed by the grates 4. On top of the grates is placed a porous hearth 6, which supports the fine ore 7, to be treated while gases are passing through it.

The ore, mixed with a sulfid and possibly also carbonaceous fuel, is charged into the holder 1, and the exhauster 12 started, which induces a blast of air through the ore. The ore may be ignited or heated by introducing oil into the hood 2, through the pipe 9, by means of compressed air, and atomized and ignited by the igniter 8. The supply of oil is regulated by the valve 10, and the air for ignition and treatment of the ore, is introduced through the openings in the hood, 62. Steam, or gases of various kinds may also be introduced into the hood through the various valves at the top. As the ore is ignited and heated the metals are volatilized and pass, with the gases, through the ore 7 and porous hearth 6, through the grates 4, into the chamber 5, and through the hollow trunnion 3, into the pipe 11, and into the exhauster 12, which forces it into the scrubber S, through the opening 13. The scrubber S, consists, preferably, of a long narrow tank or chamber 50, in which are a series of splashers 20, driven by the sprockets 26, and sprocket chains 24, when driven by the motor 25.

The splashers 20, consist of a shaft 21, on which are mounted spindles 22, and connecting the spindles are paddles 23. The shaft is mounted on pillow blocks 27, on the outside of the chamber 50, through which the shafts revolve, and the openings are maintained tight by the stuffing boxes 28. The splashers 20 are revolved at a fairly high speed, and dip into the liquid in the bottom of the chamber 50.

In the bottom of the chamber 50, are, preferably, pockets 52, formed by depressions concentric with the circumference of the rotating paddles, and designated by 51, thus forming a pool of the liquid used in the treatment of the gases, thus making the splashing very effective, and making it possible to use small amounts of liquid and bring it all under treatment.

15 is the outlet for the gases, and by means of the exhauster 17, driven by the motor 18, the gases are exhausted from the scrubber S, through the pipe 16, and forced into the condensing or reaction tower C. The tower C, may be filled with inert material, such as quartz, coke, or brick, but preferably with a material capable of reacting chemically on the values in the fumes to precipitate them, such for example, as granulated iron 40, resting on perforated support 41, and forming with the bottom of the condenser, ducts 42, by means of which the gases are evenly distributed and percolated evenly through the mass of material 40.

Water, or other liquid, is drawn from the tank 19, through the pipe 43, and sprayed over the mass of material 40, by means of which the condensed or precipitated values are washed down into the ducts 42, and from there flow through the pipe 36, and opening 37, into the scrubber S, and over the bottom of the chamber 50, filling the pockets 52, thus forming pools to facilitate the action of the splashers 20.

The splashers 20, revolve at a fairly high speed, and as the paddles hit the pools of liquid, the liquid is sprayed upwardly and in extremely fine particles into the gaseous atmosphere above, through the entire chamber.

The gases, entering the chamber at 13, are intimately mixed with sprayed liquid, and in so doing, the metal values are condensed, or precipitated, into the liquid. The gases issuing from the scrubber are usually free from metal values, but should there still be any values in the fumes, they are precipitated in passing through the condensing or reaction tower C.

If desired, the scrubber S may be used to simply wash and reduce the gases, while the values may be precipitated in the condenser C by reacting with the granulated iron 40.

Ordinarily there will be a continuous small flow of liquid through the scrubber, from the condenser, and the liquid containing the condensed or precipitated values flows from the scrubber S through the outlet 32 into the tank 31, where it may be treated to recover the metal values from the solution. The liquid may then be wasted, or through the pipe 33 flowed into the pump 35, and forced through the pipe 34 back into the tank 19, and again started on another circuit.

Should it be desirable to make a solution rich in condensed or precipitated values, a body of the liquid may be maintained in the bottom of the scrubber S, as shown in Fig. 4 and Fig. 5, and reused until saturated, or until it is desired to remove it. Or the stream may be continuous, but very small, while a large pool of the liquid is maintained, so that the desired degree of solution may be maintained. A large pool of the liquid, as shown in Figs. 4 and 5, is best used to get a strong solution from furnace gases, or strong metal solutions, before it is desirable to precipitate the metals either chemically or electrolytically. It is also a desirable condition for the absorption of gases like chlorin, in water, to get a strong saturated solution.

The apparatus may also be used as an effective precipitator of metal values, either from fumes or from the solution. If it is used as a precipitator, the precipitating gas, such as hydrogen sulfid, may be generated in the apparatus 60, and flowing into the pipe main 11, through the pipe 61, is forced with the furnace gas into the scrubber S, where the gas and liquid are intimately mixed and the precipitation made complete without the loss of precipitant. Similarly, if the liquid is, say, a metal solution from which the values are to be precipitated with a gaseous precipitant. The precipitant may be generated, either in the apparatus 60 or in the apparatus M, and by means of the exhauster 12 forced into the scrubber S, where it is intimately mixed with the metal solution, so that all the values in the solution are quickly precipitated, and no precipitant wasted, for, the leaner precipitating gas is continually coming in contact with the richer metal solution as it approaches the inlet for the solution and the outlet for the gas.

It is evident, that with the revolving splashers, the entire interior of the scrubber S is filled with a very dense mist and fine drops of liquid, and as the gases come in contact with the splashers, the gases and liquid are so thoroughly mixed and churned that the gases are quickly and thoroughly deprived of their volatile and condensable values. If the gases are hot, as they usually are, dense clouds of steam are formed which aid in the condensation or precipitation, and the fine liquid spray quickly bring the values into solution. If any of the values are carried out of the exit mechanically in the steam or spray the condenser C will effectively intercept them, and thus avoid any loss. As fast as the sprayed liquid drops to the bottom of the chamber 50, it is again elevated and sprayed into the gas by the splashers 20.

If a large amount of liquid were used the power required would be excessive. Equally good or better results can be obtained with a small stream of liquid, and, as this liquid will collect in pools as it flows through the chamber 50, it is effectively sprayed and splashed and brought into intimate contact with the gas by the splashers 20. It will be observed that the paddles 23 are so shaped with a curve 29, Fig. 6, that the liquid is scooped up from the pools and sprayed upwardly, and as it is sprayed and lifted, it is further agitated and subdivided by hitting the top of the chamber, and being hit by the rotating paddles. Similarly, the curve 51, of the depressions forming the pools, tend to throw the liquid upwardly when hit by the rotating splashers. If desired, baffles 52, may be inserted in the upper part of the chamber to prevent too even a flow of the gas along the top, but this will not usually be necessary, as the revolving splashers effectively prevent any such action, and while the gases are churned up with the liquid there is a general movement of the gas toward the exit, while there is also a general movement of the liquid in the opposite direction, although the direction of the liquid is not very material. If it is desired to increase the rate of flow of liquid, without increasing the quantity, the chamber 50, may be built on a slight incline.

It is desirable that the scrubber should be under a slight suction so that the gases or metal values cannot escape through leaks or joints in the stuffing boxes. To accomplish this the exhauster can be regulated as desired in connection with the blower 12, to maintain the suction desired and to regulate the speed of the gases through the scrubber.

The chamber 50, may be as long as desired, as found necessary to properly condense the values from the fumes, or give the absorption desired. By properly regulating the length of the chamber to the conditions, the gases may be made to issue from the scrubber thoroughly treated.

The process and apparatus may be used for various purposes other than those described, such as washing gas for gas engines, dissolving gases such as ammonia, chlorin, or sulfur dioxid, in water, precipitating metals out of solution with a gaseous precipitant, for cooling, heating or evaporating liquids, and for purifying water, especially in connection with an electric current. It also offers an effective means for treating ore sludge with a gas, such as chlorin or ammonia, for the extraction of metals, such as gold, silver, and copper, from their ores.

If corrosive liquids or gases are to be treated, only the portion of the splashers in the interior of the chamber 50 need be protected. The exterior shafting, the driving mechanism, and the pillow blocks, being located on the outside of the chamber, and the suction being preferably inwardly, these parts cannot be affected and may be made of ordinary materials for such purposes.

In Figs. 4 and 5 is shown the preferred arrangement when an electric current is to be passed through the liquid. Disks 64 are rotatably mounted on the shaft 21, and dip into the liquid in the bottom of the chamber 50 and are immersed in the gas above the liquid. These disks 64, correspond with the paddles 23, and are electrified, and arranged to spray the liquid in the gas by rotating them at sufficient speed. The spraying may be assisted by means of perforations in the disks 66, and the serrated edges 29. As the disks are rapidly rotated the disks spray a certain amount of the liquid into the gas above the liquid while a certain amount of the gas is submerged in the liquid. In this way the liquid may be charged with the gas to any desired degree, even to saturation, supersaturation, emulsification. Under these conditions, eminently satisfactory results are obtained in the electrolysis of a liquid having a gas in solution, for, not only is any desired degree of solution obtainable, but the gas is maintained in solution as rapidly as it is consumed, or combined, by means of the electric current.

The process and apparatus will now be briefly described when used to convert sulfur dioxid into sulfuric acid by electrolysis. It has long been known that if a solution of sulfur dioxid in water, or dilute sulfuric acid, is electrolyzed, the sulfur dioxid reacts with the water to make sulfuric acid, and various schemes have been proposed to carry this out practically. These schemes have practically all failed because the solubility of the gas is very low, and the impoverished solution cannot be effectively treated. To somewhat overcome this difficulty, agitation or rapid circulation of the solution previously charged with the gas, was resorted to, to bring the dissolved gas in contact with the electrodes. The gas was quickly consumed, or evaporated, and the cell room became unbearable.

In the present process and apparatus the gas is always dissolved in the liquid as rapidly as consumed, there is no evaporation, nor is the cell room contaminated with the gas. The gas, issuing from the generator M, or from the generator 60, is flowed into the chamber 50, over a dilute solution of sulfuric acid, or water. The disks, dipping into the liquid below and immersed in the gas above, are then rotated, and thus, as already described, form an intimate mixture of the gas and liquid, whereby a solution or emulsion of the gas in the liquid is obtained. When the electric current is turned on, the sulfur dioxid is oxidized to the trioxid, and the trioxid, combining with the water, forms sulfuric acid, as is well known. It is evident that with each revolution of the disks, as much of the gas is dissolved or emulsified in the liquid, as that consumed in reacting to form sulfuric acid, and thus the process may go on indefinitely. A certain amount of water is added while a certain amount of the more or less concentrated acid is withdrawn. A 10% dilute solution of sulfuric acid gives good results, but this may be made more or less to suit the conditions, and the process is efficient to a fair degree of concentration, but the concentration should not ordinarily exceed 60% to 80% $H_2SO_4$. For metallurgical work, where only dilute acids are used, a 20% concentration will usually be sufficient.

The current used in the electrolysis, passes from the brushes 70, to the shaft 21, and from the shaft to the disks 64, or spindles 22, and paddles 23, and then through the liquid to the plates 65 and 51. In passing through the liquid, oxygen is released, by the electrolytic decomposition of the water, and the nascent oxygen coming in contact with the sulfur dioxid, oxidizes it to sulfuric acid. The plate 65 may be electrically connected with the conduit. The oxygen, when released at the surface of the rapidly rotating disks is exceedingly energetic. The wear on the electrodes, under the conditions, is very small.

The process may also be used to purify water, for the oxygen and ozone are released under the most advantageous conditions.

In this process, not only is the gas in the liquid brought into intimate contact with the electrodes, which is very essential, but, what is of as great, or greater importance, the liquid is continually maintained charged with the gas during electrolysis, until the gas is sufficiently impoverished, and without wasting the gas or making the cell room unbearable. The solubility of the gas in the liquid, in this case, is not of much importance, since the gas is effectively applied to the liquid as rapidly as it is dissolved or combined chemically with the liquid.

I claim:

1. A process which consists in confining sulfur dioxid over a solution of the gas in dilute sulfuric acid, electrolyzing the solution, and maintaining the solution charged with the sulfur dioxid during electrolysis by spraying the solution into the gas above it.

2. A process which consists in confining a gas over a solution of the gas in a liquid, and intimately mixing the liquid and gas over the liquid while under the action of an electric current.

3. A process which consists in confining sulfur dioxid over a solution of the gas in dilute sulfuric acid, maintaining a supersaturated solution of the gas in the liquid during electrolysis, and passing an electric current through the liquid supersaturated with the gas.

4. A process which consists in confining a gas over a solution of the gas in a liquid, emulsifying the gas in the liquid, and passing an electric current through the emulsified liquid.

5. A process which consists in confining a gas over a liquid capable of reacting chemically with the liquid, maintaining the liquid charged with the gas by intimately mixing the liquid with the gas over it, and electrolyzing the liquid charged with the gas.

6. A process of converting sulfur dioxid into sulfuric acid which consists in confining the gas over a solution of the gas in dilute sulfuric acid, maintaining a saturated solution of the gas in the liquid by intimately mixing the liquid with the gas over it, and simultaneously passing an electric current through the liquid charged with the gas.

7. A process which consists in confining a gas over a liquid capable of reacting chemically with it, electrolyzing the liquid, and alternately rotating a portion of the electrodes in the liquid and in the gas to maintain the liquid saturated with the gas.

8. A process which consists in confining a gas over a liquid capable of reacting with it, passing an electric current through the liquid through electrodes partially immersed in the liquid and partially immersed in the gas over the liquid, rotating the electrodes with sufficient rapidity to spray the liquid into the gas confined over it, and thus keeping the liquid charged with the gas during electrolysis.

9. A process which consists in confining a gas over a liquid capable of chemically reacting with the liquid, electrolyzing the liquid, and simultaneously spraying the liquid into the gas above the liquid, and thus keeping the liquid charged with the gas during electrolysis.

10. A process which consists in confining sulfur dioxid over a solution of the gas in dilute sulfuric acid, electrolyzing the liquid, and maintaining the liquid charged with the gas over it as rapidly as the gas is converted into sulfuric acid by the action of an electric current passing through the liquid.

11. A process which consists in confining a gas over a liquid capable of chemically reacting with the gas, passing an electric current through the liquid, intimately mixing the gas and the liquid while under the action of the electric current, and maintaining a flow of gas and liquid in opposite directions.

12. A process which consists in confining a gas over a liquid capable of chemically reacting with it, passing an electric current through the liquid, intimately mixing the liquid with the gas over it during electrolysis, maintaining a flow of the gradually exhausted gas toward a gas outlet, and maintaining a flow of the gradually enriched liquid in the opposite direction.

13. A process which consists in confining sulfur dioxid over a solution of the gas in dilute sulfuric acid, electrolyzing the solution; maintaining the liquid charged with the gas over it as rapidly as the gas is converted into sulfuric acid by the action of electrolysis, exhausting the impoverished gas from the chamber and dissolving it in water, introducing the solution so obtained into the chamber, and withdrawing a certain amount of strong acid solution.

14. A process which consists in confining sulfur dioxid over a solution of the gas in dilute sulfuric acid, electrolyzing the solution, maintaining the liquid charged with the gas over it during electrolysis, and adding water or a weak acid solution to the liquid and withdrawing a certain amount of enriched acid from the liquid.

15. A process which consists in confining a gas over a solution of the gas in a liquid capable of chemically reacting with it, electrolyzing the liquid, maintaining the liquid charged with the gas during electrolysis, and maintaining a supply of the gas over the liquid from which the liquid may be charged with the gas as rapidly as the gas in the liquid is combined with the liquid by the electrolytic action.

16. A process which consists in confining a gas over a liquid containing constituents capable of chemically reacting with the gas, spraying the liquid into the gas over it, intimately mixing the sprayed liquid and gas and electrolyzing the liquid.

17. A process which consists in confining a gas over a liquid containing constituents capable of chemically reacting with the gas, intimately mixing the liquid with the gas over it, maintaining a flow of gas and liquid in opposite directions and electrolyzing the liquid.

18. A process which consists in confining a gas over a liquid containing constituents capable of chemically reacting with the gas, intimately mixing the liquid with the gas over it, maintaining a flow of gas and liquid in opposite directions, and subjecting the liquid and the gas to the action of an electric current.

19. A process which consists in confining a gas over a liquid containing constituents capable of chemically reacting with the gas, spraying the liquid upwardly into the gas, maintaining a flow of the gas through the liquid spray, and subjecting the gas and liquid to the action of an electric current.

WILLIAM E. GREENAWALT.

Witnesses:
EFFIE JACKSON,
JOHN W. GIBBS.